Aug. 4, 1942.  W. L. McGRATH  2,291,739
GALVANIC CELL
Filed April 3, 1939

Inventor
William L. McGrath
By
George H Fisher
Attorney

Patented Aug. 4, 1942

2,291,739

UNITED STATES PATENT OFFICE 2,291,739

GALVANIC CELL

William L. McGrath, St. Paul, Minn., assignor to Minneapolis-Honeywell Regulator Company, Minneapolis, Minn., a corporation of Delaware Application April 3, 1939, Serial No. 265,714

2 Claims. (Cl. 136—83)

My invention relates to temperature control and deals particularly with a system wherein a temperature responsive element generates an electromotive force, the magnitude of the electromotive force depending on the temperature to which the element is subjected.

Specifically my invention comprehends the employment of a cell which by galvanic or voltaic action is capable of generating an electromotive force in combination with means responsive to variations in the electromotive force occasioned by changes in temperature affecting the cell.

The temperature control art is needful of improvements in control embodying principles upon which my invention is based. The principles to which I refer are concerned mainly with temperature control from an electrical means capable of generating its own electromotive force. By utilization of such a device the need of external current sources is obviated and of course the exigencies arising as a result of failure of the power supply from such sources are removed. Furthermore, systems can be made self-contained and self-dependent with one element performing services for which otherwise a considerably greater amount of equipment is required.

The use of thermo-couples and thermopiles as temperature responsive control means is known to the art but the application of a thermo-couple for such purpose is limited to high temperatures. The application of thermo-couples is further limited by their lack of sensitiveness in response to temperature change and by the fact that only very low power is available from them.

My invention comprehends the construction of galvanic or voltaic cells having a desired degree of temperature sensitivity suitable to the particular control application and their use in combination with apparatus responsive to a greater or lesser degree to variations in the electromotive force of the cells.

Those skilled in the art are familiar generally with galvanic or voltaic action and the general construction and classification of the various types of cells in which the said action takes place. Briefly, such cells consist of a pair of electrodes of different electrochemical characteristics immersed in a liquid electrolyte (if the cell is a wet cell) wherein there is a chemical action between the electrodes and electrolyte causing an electrical potential to be produced between the electrodes externally of the cell.

Cells of the types being described and referred to have a temperature coefficient of electromotive force which is a constant expressing the relation between temperature and the electromotive force generated by the cell. This coefficient may be positive or negative depending upon whether the electromotive force of the cell increases or decreases as the temperature increases.

My invention contemplates the selection of a particular type and suitable construction of cell adapted to the temperature control application to which it is to be put and its combination with apparatus suited to the nature of the cell and the results desired to be gained. Thus various of the cells referred to above may find their particular adaptation in practicing my invention. It is apparent from the description of the cells above that because of their various different properties depending on the nature of the cell they offer a far greater range of adaptability, among other advantages, than is offered by a thermo-couple or like instrumentality.

In practicing my invention one of the cells may act as a control unit operating at ordinary temperatures or one of the cells may be used operating at temperatures of a flame directly impinging on the cell. As an example of a cell for the latter application it might comprise an electrolyte of anhydrous sodium chloride with one electrode of magnesium or zinc and one of iron or carbon. Anhydrous sodium chloride melts at 1500° F. and becomes an electrolyte at approximately that temperature. Thus with this particular cell a current would be generated and caused to flow by the cell at approximately 1500° F. As an example of a similar cell for lower temperatures it might consist of an electrolyte of anhydrous sodium hydroxide with electrodes of the same materials as in the preceding example, anhydrous sodium hydroxide melting at approximately 600° F. The property possessed by these particular cells in that they comprise a substance which is normally a solid and which at a well defined temperature point melts and becomes an electrolyte is particular advantageously made use of in my invention. Thus when the substance is a solid it is not an electrolyte and no current flows. At a fairly well defined temperature point the substance will melt and the cell will generate a working current for the system in which the cell is used. Thus these cells are peculiarly well adapted for use as flame detectors, the cell supplying working current only when flame is present.

An object of my invention is to provide improved temperature responsive means capable of generating an electromotive force.

Another object is to provide a voltaic or galvanic cell so constructed as to be capable of generating an electromotive force variable in accordance with the temperature of the cell.

Another object is to provide a voltaic or galvanic cell comprising a substance adapted to melt at a predetermined temperature, the substance becoming an electrolyte at its melting point.

Another object is to provide a temperature control system wherein the system is controlled in response to the temperature of a voltaic or galvanic cell, the cell furnishing the working control current for the system.

For a more complete understanding of my invention reference may be had to the annexed drawing of representative embodiments thereof and the detailed description following.

It is to be understood that my disclosure herein is intended to present the general theory of my invention and discloses concrete representative modes of practicing it in sufficient detail so that those skilled in the art may with the benefit of my disclosure formulate and devise modes of practicing my invention other than the specific ones which I have disclosed.

Figure 1:
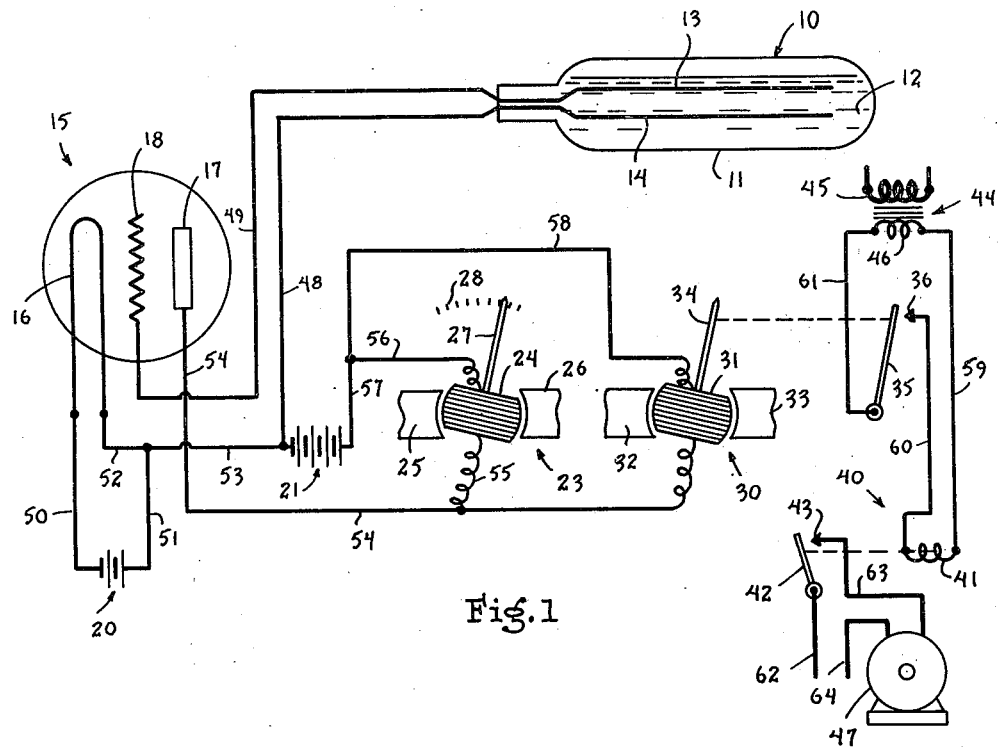
Figure 1 is a diagrammatic representation of a temperature control system embodying my invention wherein a cell capable of generating an electromotive force cooperates with an electronic discharge device acting as a current amplifier.

In Figure 1 of the drawing, I have represented a system comprising an electric motor which is controlled from a galvanic or voltaic cell 10 acting as a temperature responsive device. The cell 10 comprises a capsule 11 which is filled with an electrolyte 12 which in this instance is a liquid electrolyte and immersed in the electrolyte is a pair of electrodes 13 and 14. Inasmuch as the voltage change of a cell of this type is not large and it is contemplated that the arrangement of this figure be quite sensitive, I employ a device for amplifying the voltage generated by the cell. The instrumentality for amplifying the voltage generated by the cell. The instrumentality for amplifying the voltage takes the form of an electron discharge device 15 which in this instance is a three-element vacuum tube of known construction. The tube 15 comprises a filament 16, a plate 17, and a grid 18 interposed in the path of the electron flow between the filament and the plate. The filament 16 is heated by power supplied from a battery 20 which is connected to the filament in the usual manner. Numeral 21 designates a second battery, the rate of discharge of which is controlled by the vacuum tube, the bias of the grid 18 governing the rate of discharge of the battery 21. The grid 18 is connected to the negative terminal of the cell 10 so that it is normally biased negatively. The cell 10 in this particular instance is one having a positive temperature coefficient of electromotive force, that is, the electromotive force generated by the cell increases as the temperature of the cell increases. The batteries 20 and 21 are conventional dry cells having a very low temperature coefficient of electromotive force.

The rate at which current flows from the battery 21 is a function of the bias of grid 18 which varies in accordance with the electromotive force of the cell 10. For measuring the rate of discharge of the battery 21 and consequently the temperature affecting the cell 10 which determines its electromotive force, I employ a sensitive galvanometer unit 23. The unit 23 comprises a pivoted armature winding 24 mounted between pole pieces 25 and 26. The armature 24 carries a pointer 27 which is arranged to oscillate over a graduated scale 28 so as to indicate temperature on the scale. The armature 24 is connected in the plate circuit of the tube 15. Connected in parallel with the unit 23 is a similar galvanometer unit 30 having a pivoted armature winding 31 mounted between pole pieces 32 and 33. The armature 31 carries pointer 34 which is connected to a movable switch blade 35 which cooperates with a fixed electrical contact 36. The armatures 24 and 31 are connected in parallel so that the two galvanometer units move correspondingly depending upon the amount of current which is permitted to flow from the battery 21. When no current is flowing through the armatures, the pointers 27 and 34 will assume a vertical position.

The switch 35 controls an electrical relay 40 comprising a winding 41 cooperating with an armature arranged to actuate a switch blade 42, the blade 42 moving into contact with a fixed contact 43 when the winding 41 is energized. Power for operation of the relay 40 is supplied from a voltage step-down transformer 44 comprising a primary winding 45 and a secondary winding 46, the secondary winding having a lesser number of turns than the primary winding. The primary winding 45 may be connected to any suitable source of external power, not shown. The switch 42 controls an electric motor 47 which may be a motor driving a fuel supplying device or the like, or any other apparatus adapted to be thermostatically controlled may be substituted for the motor 47.

In the embodiment of Figure 1, the cell 10 may appropriately be responsive to space temperatures within the range in which the chosen electrolyte is active, and motor 47 may, as suggested, be part of a system comprising fuel supplying means wherein the motor 47 drives the fuel supplying means. As previously set forth, the electromotive force generated by the cell 10 will vary in accordance with the temperature affecting the cell and inasmuch as this cell has a positive temperature coefficient of electromotive force, as the temperature affecting the cell decreases, its developed electromotive force will decrease. As pointed out previously, grid 18 is negatively biased; the positive electrode 14 of cell 10 is connected by wires 48, 53, and 52, to the filament while the negative electrode 13 is connected by wire 49 to the grid whereby the grid is negative with respect to the filament. The galvanometer units 23 and 30 will take a position as shown depending upon the amount of negative bias of the grid 18 which is governed by the temperature affecting the cell 10. With the parts of Figure 1 in the position shown, the temperature affecting the cell is above the value at which it is desired that the motor 47 should start. As the temperature adjacent cell 10 falls, the electromotive force of the cell will decrease and as it decreases grid 18 will be biased less negatively. As grid 18 is biased less negatively, there is greater freedom of flow of electrons between filament 16 and plate 17, or in other words, battery 21 is allowed to discharge at a greater rate.

The filament 16 is continuously heated by the battery 20, as pointed out above, the battery being connected to the filament by wires 50, 51, and 52. Also as mentioned above, the armature winding 24 is connected in the plate circuit of the two, the circuit of armature 24 being as follows: from battery 21 through wire 57, wire 56, armature winding 24, wire 54, plate 17, filament 16, and wires 52 and 53 back to the battery 21. The armature winding 31 is in parallel with the winding 24, the circuit for armature 31 being as follows: from battery 21 through wire 57, wire 56, armature winding 31, wire 54, plate 17, filament 16, and wires 52 and 53 back to battery 21. The armatures 24 and 31 will move in a clockwise direction as long as the temperature affecting cell 10 continues to decrease and to thereby bias the grid 18 less negatively. When the temperature at cell 10 reaches a predetermined value, blade 35 will be moved into engagement with contact 36 energizing winding 41 of relay 40 through the following circuit: from secondary winding 46 of transformer 44 through wire 59, winding 41, wire 60, contact 36, blade 35, and wire 61 back to winding 46. As soon as relay 40 is energized, switch 42 is closed energizing motor 47 through the following circuit: from wire 62 to blade 42, contact 43, wire 63, motor 47 back to wire 64. Wires 62 and 64 may be connected to any suitable source of power, not shown. The motor will continue in operation as long as the temperature affecting the cell 10 is low enough to maintain switch 35 in closed position. The galvanometer unit 23 will of course at all times indicate the temperature affecting the cell 10 on the scale 28. When the temperature affecting the cell 10 rises, the armatures 24 and 31 will move in the opposite direction due to the grid 18 now becoming more negatively biased.

From the foregoing it is apparent that my invention provides a temperature sensitive device which generates its own control current which may be amplified as desired for indicating and control purposes. The cell 10 is adaptable to a wide range of applications and may be constructed in the form of a unitary replaceable capsule, or the like, so that it may be easily and conveniently replaced in the event of serious deterioration or failure of the cell.

Figure 2:
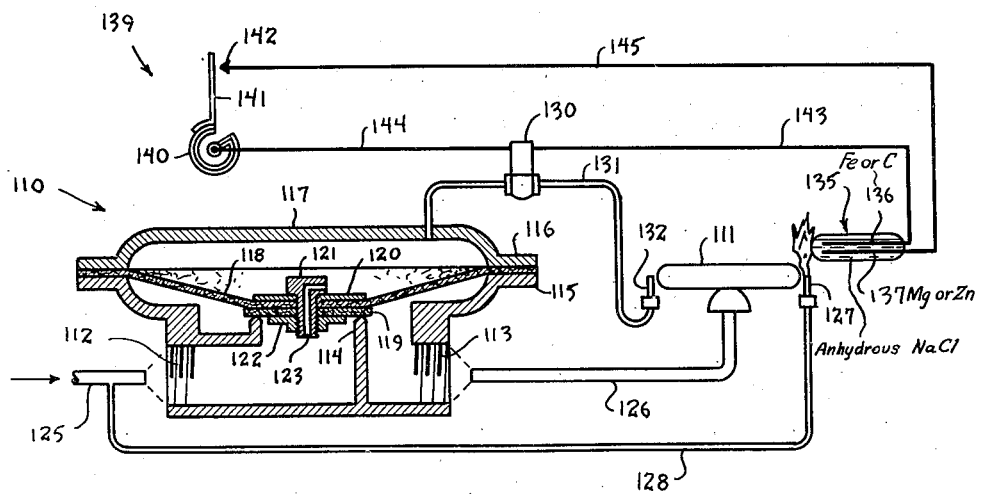
Figure 2 is a diagrammatic representation of a gas burner system wherein a pilot valve is controlled by a cell responsive to temperature of a pilot flame.

In Figure 2 I have shown another preferred form of my invention wherein the cell employed is of a type peculiarly adapted to high temperatures higher than 1500° F., for example. In Figure 2, numeral 110 represents a diaphragm type gas valve of conventional type controlling a flow of gaseous fuel to a burner 111. The valve 110 is shown in cross-section having an inlet 112 and an outlet 113, the valve being internally configurated so as to form a seat at 114. The upper part of the body of the valve is preferably of circular conformation having a flange 115 corresponding with a flange 116 forming part of a cover member 117. Interposed between the flanges 115 and 116 is the peripheral portion of a diaphragm 118, the flanges and diaphragm being securely sealed together in a suitable manner. The diaphragm 118 carries a valve member comprising a seat disc 119 on one side of the diaphragm and a rigid backing disc 120 on the opposite side of the diaphragm, the discs and diaphragm being secured together by means of a bolt 121 and a disc nut 122. The diaphragm 118 and the disc 119 may be made of a suitable flexible material such as leather. The bolt 121 has a channel 123 extending therethrough providing communication between the inlet of the valve and the chamber above the diaphragm. The inlet of the valve is connected to a gas supply conduit 125 and the outlet of the valve communicates with the burner 111 by means of a conduit 126. Adjacent the burner 111 is a constantly burning pilot burner 127 supplied with fuel through a tube 128 connected to the gas supply conduit 125. The valve 110 is controlled by regulating the pressure above the diaphragm 118. This pressure is controlled by a small electric pilot valve 130 interposed in a vent tube 131 connecting the chamber above the diaphragm with an auxiliary pilot burner 132. Whenever valve 130 is closed, the pressure above the diaphragm 118 keeps the valve closed, this pressure being communicated to the space above the diaphragm from the inlet of the valve through the channel 123. When the valve 130 is opened, the pressure above the diaphragm is bled off faster than it can be communicated thereto through the channel 123 so that the valve opens admitting gas to the burner. The valve 110 and its operation as so far described are conventional and well known in the art.

Adjacent the flame of the pilot burner 127 and arranged so as to be affected by the heat of the flame is a voltaic or galvanic cell 135 which is adapted to act as a flame detector. The cell of this embodiment is of the type having a pair of electrodes 136 and 137 and an electrolyte consisting of anhydrous sodium chloride which is an electrolyte and is in liquid form when the pilot burner is burning and the heat of the flame is affecting the cell. Anhydrous sodium chloride melts at substantially 1500° F. and at approximately this temperature when it melts it becomes an electrolyte. When the anhydrous sodium chloride is a solid it is not an electrolyte and the cell does not generate an electromotive force. Where the pilot flame is of a type the temperature of which is seldom above 1500° F., it is, of course, preferable to use anhydrous sodium hydroxide, which as stated earlier becomes an electrolyte at approximately 600° F.

The pilot valve 130 is arranged to be controlled by a room or space thermostat or the like 139 comprising a bimetal element 140 arranged to actuate a switch blade 141 cooperating with a fixed electrical contact 142. It is to be observed that the electrical power for operating the pilot valve 130 is supplied by the cell 135. Whenever the pilot flame is burning and the cell 135 is generating an electromotive force, the valve 110 may be opened in response to the thermostat 139. Assuming that the pilot burner is burning and the temperature in the room or space drops to a predetermined value, thermostat 139 will close completing a circuit for energizing and opening the valve 130 as follows: from electrode 136 of cell 135 through wire 143, valve 130, wire 144, element 140, blade 141, contact 142, and wire 145 back to electrode 137 of cell 135. When valve 130 opens, the pressure above diaphragm 118 is released and valve 110 opens causing fuel to be supplied to the burner 111. In the present embodiment of the invention should the pilot burner become extinguished the temperature of the cell 135 would quickly fall to some value below 1500° F. The anhydrous sodium chloride in the cell would solidify and the cell would of course then not generate an electromotive force causing valve 130 to close and consequently the valve 110 to close. Obviously, the cell 135 acts somewhat in the manner of a switch as well as a device capable of supplying control current, that is, it is only when the temperature of the cell is at a relatively high value of above 1500° F. that the valve 130 can be opened and the power for opening the valve 130 is at such times supplied by the cell itself. Whenever the pilot flame should become accidently extinguished, the cell cuts off the supply of power to the valve 130 and it cannot again be supplied until the cell 135 is properly heated.

From the foregoing, it is apparent that I have provided a novel temperature responsive device and have embodied it in a combination wherein the peculiar properties of the device are made use of in a new and advantageous manner. Cells of the type which I have described are capable of supplying sufficient power for control purposes and they offer a wide range of adaptability. The particular cell which I have described in connection with Figure 2 because of its particular properties, as pointed out in detail, is ideally adapted for use in the combination in which I have disclosed it. These cells can be inexpensively manufactured and provide convenient and useful articles for use in automatic temperature control and allied arts.

The two representative embodiments of my invention which I have disclosed in detail exemplify two modes according to which my invention may be practiced. These modes of practicing my invention are illustrative of various other applications to which my invention may be put and of various other modes by which it may be practiced. My disclosure is therefore not to be construed in a limiting sense, the boundaries of my invention to be determined only in accordance with the appended claims.

I claim as my invention:

1. A galvanic cell comprising a receptacle, a pair of electrodes of substantially different electrochemical properties, and an electrolyte of anhydrous sodium chloride within said receptacle in contact with said electrodes.

2. A galvanic cell comprising a receptacle, an electrode of a group consisting of magnesium and zinc, a second electrode of a group consisting of iron and carbon, and an electrolyte of anhydrous sodium chloride, said electrolyte being disposed within said receptacle in contact with said electrodes.

WILLIAM L. McGRATH.